(12) United States Patent
Wang et al.

(10) Patent No.: US 7,755,710 B2
(45) Date of Patent: Jul. 13, 2010

(54) PIXEL STRUCTURE

(75) Inventors: Ming-Tsung Wang, Keelung (TW); Chih-Chung Liu, Changhua County (TW); Yueh-Ping Chang, Kaohsiung (TW); Meng-Chieh Tai, Yilan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 376 days.

(21) Appl. No.: 11/840,995

(22) Filed: Aug. 19, 2007

(65) Prior Publication Data
US 2008/0303970 A1 Dec. 11, 2008

(30) Foreign Application Priority Data
Jun. 7, 2007 (TW) .............................. 96120514 A

(51) Int. Cl.
G02F 1/136 (2006.01)
G02F 1/1343 (2006.01)

(52) U.S. Cl. ........................................ 349/48; 349/144
(58) Field of Classification Search .................. 349/48, 349/144
See application file for complete search history.

(56) References Cited

U.S. PATENT DOCUMENTS

| | | | | |
|---|---|---|---|---|
| 5,164,851 A * | 11/1992 | Kanemori et al. | ............. | 349/55 |
| 7,460,191 B2 * | 12/2008 | Song | ............................ | 349/48 |
| 7,508,463 B2 * | 3/2009 | Tai et al. | ........................ | 349/48 |
| 7,615,782 B2 * | 11/2009 | Hoshino | ....................... | 257/59 |
| 7,652,725 B2 * | 1/2010 | Lee et al. | ........................ | 349/38 |
| 2005/0030460 A1 | 2/2005 | Kim et al. | | |
| 2006/0023137 A1 | 2/2006 | Kamada et al. | | |
| 2006/0028589 A1 | 2/2006 | Um et al. | | |
| 2006/0268186 A1 | 11/2006 | Kamada et al. | | |
| 2008/0239190 A1 * | 10/2008 | Hsu et al. | ..................... | 349/48 |

* cited by examiner

*Primary Examiner*—Uyen-Chau N Le
*Assistant Examiner*—John M Bedtelyon
(74) *Attorney, Agent, or Firm*—Jianq Chyun IP Office

(57) ABSTRACT

A pixel structure includes a gate, a source, a first drain, a second drain, a third drain, a first pixel electrode, a second pixel electrode, a scan line and a data line. The gate, the source and the first drain form a first thin film transistor. The gate, the source and the second drain form a second thin film transistor. The gate, the second drain and the third drain form a sub-thin film transistor (sub-TFT). Additionally, the first pixel electrode is electrically connected to the first drain, and the second drain extends to a portion between the second pixel electrode and the substrate such that a capacitor-coupling electrode is formed. Moreover, the second pixel electrode is electrically connected to the third drain of the sub-TFT. The scan line is disposed on the substrate and electrically connected to the gate, and the data line is electrically connected to the source.

6 Claims, 5 Drawing Sheets

PIXEL STRUCTURE

CROSS-REFERENCE TO RELATED APPLICATION

This application claims the priority benefit of Taiwan application serial no. 96120514, filed Jun. 7, 2007. All disclosure of the Taiwan application is incorporated herein by reference.

BACKGROUND OF THE INVENTION

1. Field of the Invention

The present invention generally relates to a pixel structure, and more particularly, to a pixel structure capable of improving display quality.

2. Description of Related Art

The rapid development of multi-media comes mostly as a result of the recent advance in the production of semiconductor devices and display apparatus. Liquid crystal display, with its high display quality, good spatial utilization, low power consumption and radiation-free operation, has gradually become the mainstream display product in the market. To provide better display quality to the liquid crystal display, all kinds of wide viewing angle liquid crystal displays have been developed. The most common ones include, for example, the in-plane switching (IPS) liquid crystal display, the fringe field switching liquid crystal display, the multi-domain vertical alignment (MVA) liquid crystal display and so on.

FIG. 1 is a schematic cross-sectional view of a conventional pixel structure. As shown in FIG. 1, the conventional pixel structure 100 includes a substrate 112, a thin film transistor T, a capacitor-coupling electrode 118c, a first pixel electrode 119a, a second pixel electrode 119b and an alignment film PI. The thin film transistor T mainly includes a gate 114, a gate insulating layer 116, a semiconductor layer 117, a source 118a and a drain 118b. In FIG. 1, the thin film transistor T is a bottom gate structure, and the thin film transistor T is covered by the passivation layer 120. More specifically, the thin film transistor T is disposed on the substrate 112, and the capacitor-coupling electrode 118c is electrically connected to the drain 118b of the thin film transistor T. In addition, the first pixel electrode 119a is electrically connected to the drain 118b of the thin film transistor T, and the capacitor-coupling electrode 118c is located between the second pixel electrode 119b and the substrate 112.

In an ideal condition, the first pixel electrode 119a is electrically insulated from the second pixel electrode 119b, and the second pixel electrode 119b is coupled to the capacitor-coupling electrode 118c underneath. In other words, after turning on the active device T, the first pixel electrode 119a and the second pixel electrode 119b can have different voltages so that the liquid crystals (not shown) corresponding to the first pixel electrode 119a and the second pixel electrode 119b can have different inclining states. It should be noted that residual charges on the second pixel electrode 119b and the alignment film PI are difficult to remove because the second pixel electrode 119b is in a floating state. Consequently, the performance of the second pixel electrode 119b will be affected by the residual charges so that the problem of having a residual image in the next display picture needs to be solved.

SUMMARY OF THE INVENTION

Accordingly, the present invention provides a pixel structure capable of preventing the display of a residual image in a picture.

The present invention also provides another pixel structure with good display quality.

According to an embodiment of the present invention, a pixel structure suitable for disposing on a substrate is provided. The pixel structure includes a thin film transistor, a first pixel electrode, a second pixel electrode, a scan line and a data line. The thin film transistor is disposed on the substrate. The thin film transistor of the present invention includes a gate, a source, a first drain, a second drain and a third drain. A first thin film transistor is formed by the gate, the source and the first drain. A second thin film transistor is formed by the gate, the source and the second drain. A sub-thin film transistor (sub-TFT) is formed by the gate, the second drain and the third drain. When the sub-TFT and the second thin film transistor are turned on, the conducting current of the sub-TFT is smaller than the conducting current of the second thin film transistor and the conducting currents form a specific ratio. Additionally, the first pixel electrode is electrically connected to the first drain of the first thin film transistor, and the second drain extends to a portion between the second pixel electrode and the substrate such that a capacitor-coupling electrode is formed. Moreover, the second pixel electrode is electrically connected to the third drain of the sub-TFT. The scan line is disposed on the substrate and electrically connected to the gate, and the data line is electrically connected to the source.

In an embodiment of the present invention, the specific ratio is between 0.05~0.3, for example.

In an embodiment of the present invention, the first pixel electrode has a plurality of slits.

In an embodiment of the present invention, the second pixel electrode has a plurality of slits.

In an embodiment of the present invention, the pixel structure further includes a common line distribution pattern disposed on the substrate and electrically connected to a common voltage.

In an embodiment of the present invention, at least a portion of the common line distribution pattern extends along the edge of the first pixel electrode and the second pixel electrode.

The present invention also provides a pixel structure suitable for disposing on a substrate. The pixel structure of the present invention includes a thin film transistor, a first pixel electrode, a second pixel electrode, a scan line and a data line. The thin film transistor is disposed on the substrate. The thin film transistor of the present invention includes a gate, a source, a first drain and a second drain. Additionally, a main thin film transistor is formed by the gate, the source and the first drain. A sub-thin film transistor (sub-TFT) is formed by the gate, the first drain and the second drain. When the main thin film transistor and the sub-TFT are turned on, the conducting current of the sub-TFT is substantially smaller than the conducting current of the main thin film transistor, and their conducting currents form a specific ratio. The first pixel electrode of the present invention is electrically connected to the first drain, and a portion of the first drain extends to a portion of the between the second pixel electrode and the substrate such that a capacitor-coupling electrode is formed. Moreover, the second pixel electrode is electrically connected to the second drain of the sub-TFT. The scan line is disposed on the substrate and electrically connected to the gate, and the data line is electrically connected to the source.

In an embodiment of the present invention, the specific ratio is between 0.05~0.3, for example.

In an embodiment of the present invention, the first pixel electrode has a plurality of slits.

In an embodiment of the present invention, the second pixel electrode has a plurality of slits.

In an embodiment of the present invention, the pixel structure further includes a common line distribution pattern disposed on the substrate and electrically connected to a common voltage.

In an embodiment of the present invention, at least a portion of the common line distribution pattern extends along the edge of the first pixel electrode and the second pixel electrode.

In the present invention, a sub-thin film transistor having a very small conducting current is electrically connected to a second pixel electrode corresponding to the capacitor-coupling electrode. Therefore, the second pixel electrode may utilize the sub-thin film transistor of the present invention to remove unwanted residual charges so as to prevent the performance of the second pixel electrode from being adversely affect and effectively suppress the problem of having residual-image in a display picture.

In order to make the aforementioned and other objects, features and advantages of the present invention comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
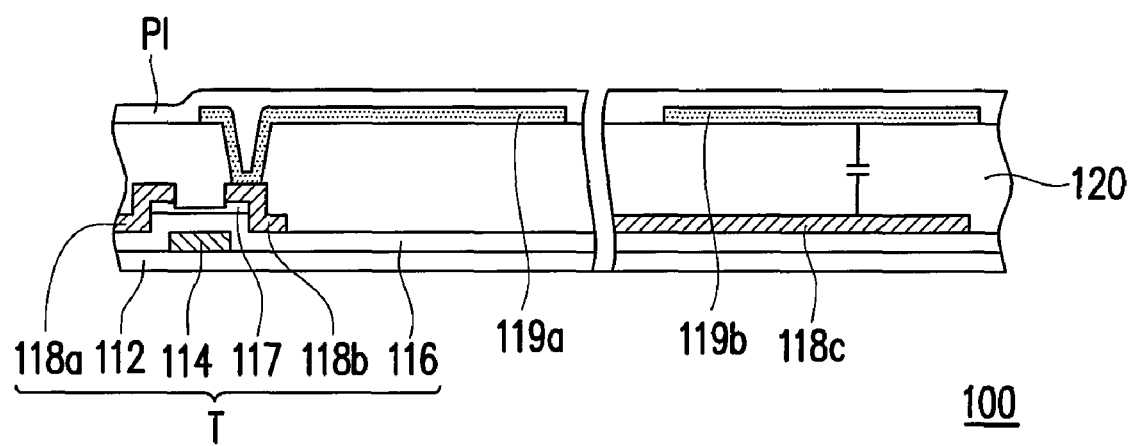
FIG. 1 is a schematic cross-sectional view of a conventional pixel structure.

Reference will now be made in detail to the present preferred embodiments of the invention, examples of which are illustrated in the accompanying drawings. Wherever possible, the same reference numbers are used in the drawings and the description to refer to the same or like parts.

First Embodiment

Figure 2A:
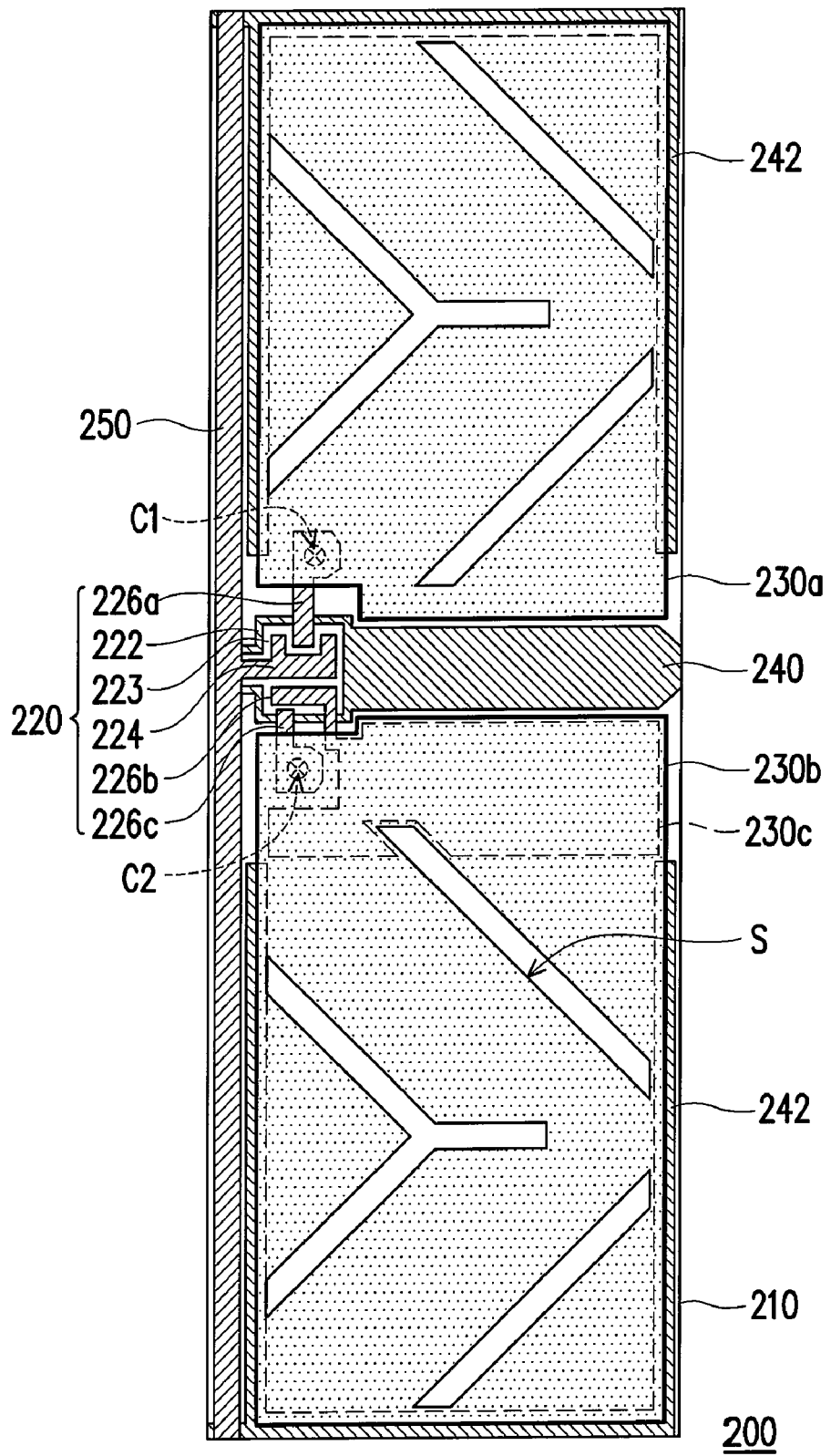
FIG. 2A is a pixel structure according to a first embodiment of the present invention.
Figure 2B:
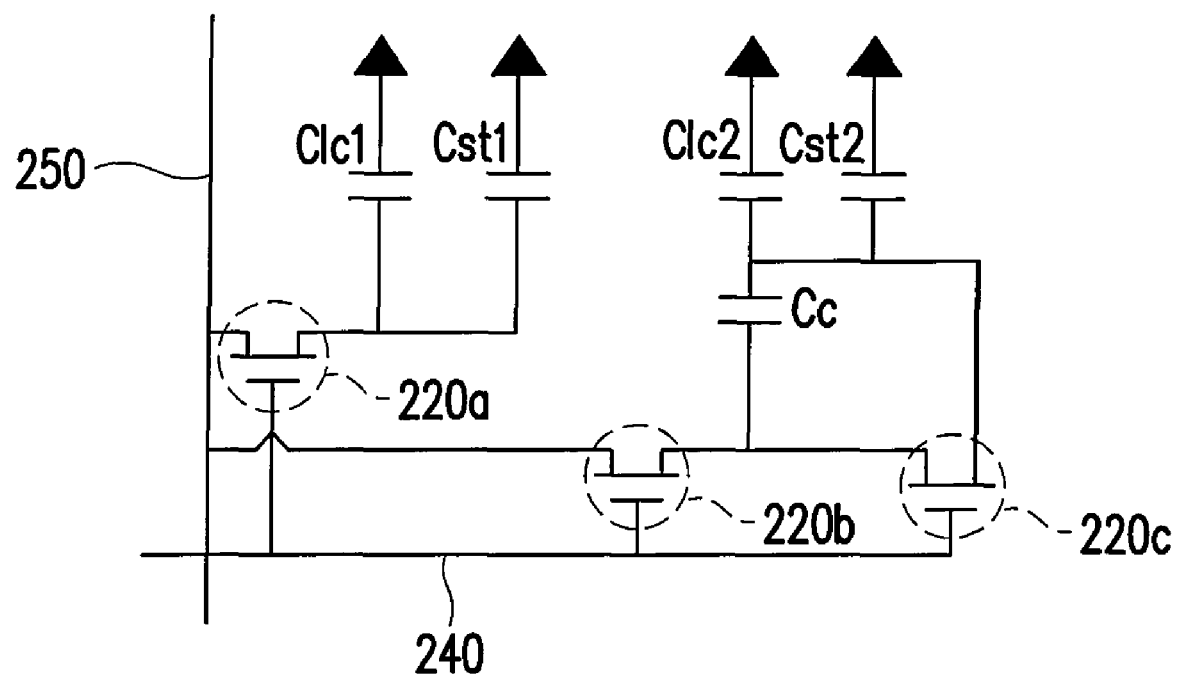
FIG. 2B is a circuit diagram of the pixel structure according to the first embodiment of the present invention.

FIG. 2A is a pixel structure according to a first embodiment of the present invention. FIG. 2B is a circuit diagram of the pixel structure according to the first embodiment of the present invention. As shown in FIGS. 2A and 2B, the pixel structure 200 of the present invention includes a thin film transistor 220, a first pixel electrode 230a, a second pixel electrode 230b, a scan line 240 and a data line 250. The thin film transistor 220 is disposed on a substrate 210 and electrically connected to the scan line 240 and the data line 250. In practice, a switching signal can be transmitted through the scan line 240 to turn on the thin film transistor 220. After turning on the thin film transistor 220, a display signal can be transmitted to the first pixel electrode 230a and the second pixel electrode 230b through the data line 250.

The thin film transistor 220 of the present invention includes a gate 222, a semiconductor layer 223, a source 224, a first drain 226a, a second drain 226b and a third drain 226c. It should be mentioned that the thin film transistor 220 shown in FIG. 2A is a bottom gate structure. Obviously, the thin film transistor 220 can also be a top gate structure. Here, the bottom gate structure is chosen only as an example and is not intended to limit the present invention.

More specifically, the scan line 240 is electrically connected to the gate 222, and the data line 250 is electrically connected to the source 224. The gate 222 can be part of the extension of the scan line 240, and the source 224 can be part of the extension of the data line 250. As shown in FIG. 2B, it should be mentioned that a thin film transistor 220a is formed by the gate 222, the source 224 and the first drain 226a of the present invention. A second thin film transistor 220b is formed by the gate 222, the source 224 and the second drain 226b. A sub-thin film transistor (sub-TFT) 220c is formed by the gate 222, the second drain 226b and the third drain 226c. In particular, when the sub-TFT 220c and the second thin film transistor 220b are turned on, the conducting current of the sub-TFT 220c is substantially smaller than the conducting current of the second thin film transistor 220b, and there is a specific ratio between the conducting currents. For example, the conducting current of the sub-TFT 220c can be 0.05 to 0.3 times the conducting current of the second thin film transistor 220b.

It should be noted from FIGS. 2A and 2B that the first pixel electrode 230a of the present invention could be electrically connected to the first drain 226a of the first thin film transistor 220a through a contact opening C1. In addition, the second drain 226b of the second thin film transistor extends to a portion between the second pixel electrode 230b and the substrate 210 such that a capacitor-coupling electrode 230c is formed. In particular, the second pixel electrode 230b can be electrically connected to the third drain 226c of the sub-TFT through a contact opening C2. In general, the first pixel electrode 230a and the second pixel electrode 230b may have a plurality of slits S so that liquid crystals (not shown) can be divided into a plurality of domains.

Furthermore, the pixel structure 200 of the present invention may also includes a common line pattern 242 disposed on the substrate 210. At least a portion of the common line pattern 242 of the present invention extends along the edge of the first pixel electrode 230a and the second pixel electrode 230b. Obviously, the common line pattern 242 shown in FIG. 2A can have other shapes and can be selected on demand. Here, the shape of the common line pattern 242 is used only as an example and is not intended to limit the present invention. In practice, the common line pattern 242 only has to be electrically connected to a common voltage.

More specifically, after turning on the first thin film transistor 220a, the second thin film transistor 220b and the sub-TFT 220c, a display signal can be transmitted to the first pixel electrode 230a through the first thin film transistor 220a. Here, it should be mentioned that the first pixel electrode 230a could form a first storage capacitor Cst1 (as shown in FIG. 2B) with the common line pattern 242 underneath and form a first liquid crystal capacitor Clc1 with a common electrode above an upper color filter (not shown).

Additionally, the second pixel electrode 230b can couple with the capacitor-coupling electrode 230c underneath to form a coupling capacitor Cc (as shown in FIG. 2B), and form a second storage capacitor Cst2 with the common line pattern 242. On the other hand, a second liquid crystal capacitor Clc2 can be formed by the second pixel electrode 230b and the common electrode of the upper color filter (not shown). In other words, the first pixel electrode 230a and the second pixel electrode 230b can have different voltages. As a result, the liquid crystals (not shown) corresponding to the first pixel electrode 230a and the second pixel electrode 230b can have different inclining states so as to provide a wide viewing angle in the display.

It should be note that the performance of the second pixel electrode 230b would not be affected because the conducting current of the sub-TFT 220c is very small. Here, it should be mentioned that the residual charges on the second pixel electrode 230b of a previous display picture could be removed through the sub-TFT 220c. As a result, the problem of having residual charges on the second pixel electrode 119b (as shown in FIG. 1) in the conventional design can be resolved. Therefore, the pixel structure 200 of the present invention can effectively suppress residual image and improve display quality. Moreover, it should be said the magnitude of the conducting current of the sub-TFT 220c can be suitably adjusted according to the actual requirements as long as it does not affect the normal performance of the second pixel electrode 230b.

Second Embodiment

Figure 3A:
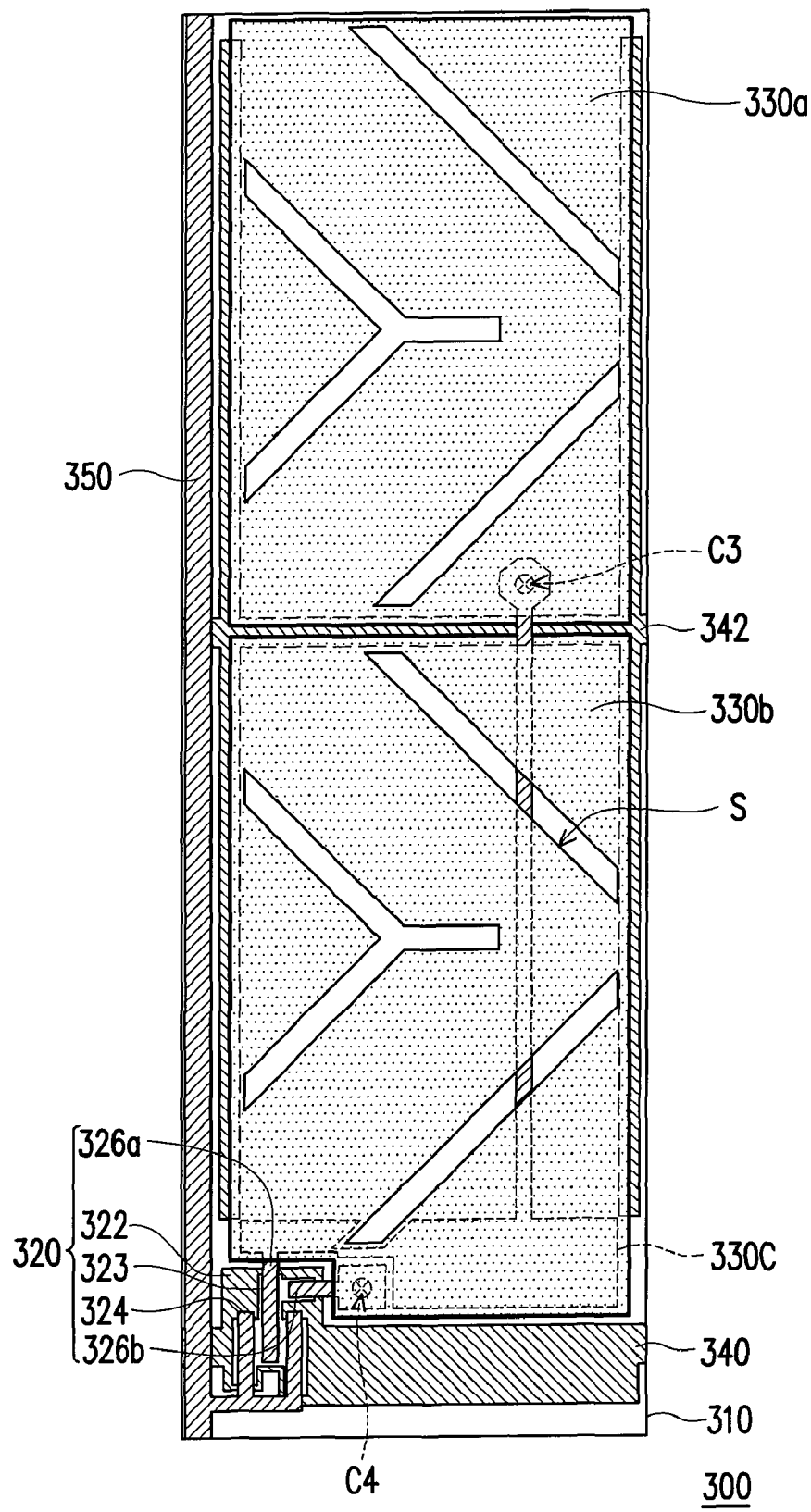
FIG. 3A is a pixel structure according to a second embodiment of the present invention.
Figure 3B:
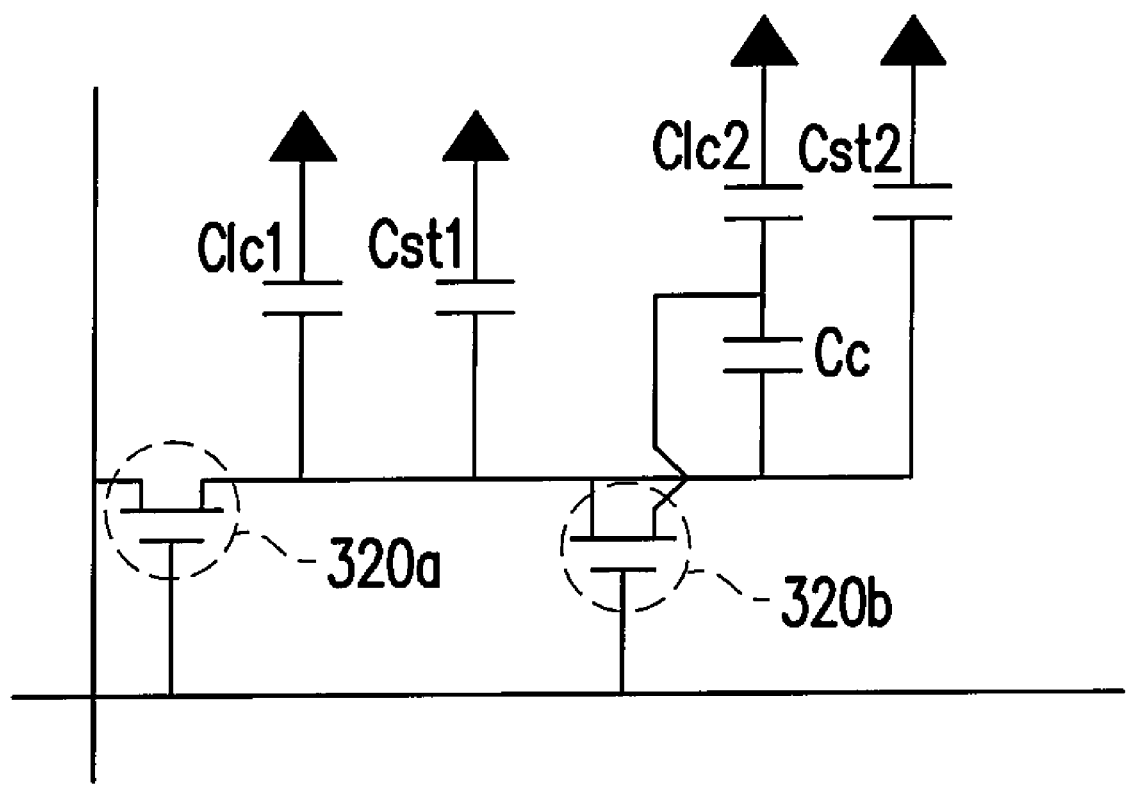
FIG. 3B is a circuit diagram of the pixel structure according to the second embodiment of the present invention.

FIG. 3A is a pixel structure according to a second embodiment of the present invention. FIG. 3B is a circuit diagram of the pixel structure according to the second embodiment of the present invention. As shown in FIGS. 3A and 3B, the pixel structure 300 of the present invention includes a thin film transistor 320, a first pixel electrode 330a, a second pixel electrode 330b, a scan line 340 and a data line 350. The thin film transistor 320 is disposed on a substrate 310 and electrically connected to the scan line 340 and the data line 350. In practice, a switching signal can be transmitted to turn on the thin film transistor 320 through the scan line 340. After turning on the thin film transistor 320, a display signal can be transmitted to the first pixel electrode 330a and the second pixel electrode 330b through the data line 350.

More specifically, the thin film transistor 320 of the present invention includes a gate 322, a semiconductor layer 323, a source 324, a first drain 326a and a second drain 326b. It should be mentioned that the thin film transistor 320 shown in FIG. 3A is a bottom gate structure. Obviously, the thin film transistor 320 can also be a top gate structure. Here, the bottom gate structure is chosen only as an example and is not intended to limit the present invention.

In practice, the scan line 340 is electrically connected to the gate 322, and the data line 350 is electrically connected to the source 324. The gate 322 can be part of the extension of the scan line 340, and the source 324 can be part of the extension of the data line 350. Here, it should be mentioned that the gate 322, the source 324 and the first drain 326a of the present invention form a main thin film transistor 320a as shown in FIG. 3B. As shown in FIG. 3B, a sub-thin film transistor (sub-TFT) 320b is formed by the gate 322, the first drain 326a and the second drain 326b. In particular, when the main thin film transistor 320 and the sub-TFT 320b are turned on, the conducting current of the sub-TFT 320b is substantially smaller than the conducting current of the main thin film transistor 320a, and there is a a specific ratio between the conducting currents. For example, the conducting current of the sub-TFT 320b can be 0.05 to 0.3 times the conducting current of the main thin film transistor 320a.

As shown in FIGS. 3A and 3B, the first pixel electrode 330a of the present invention can be electrically connected to the first drain 326a through a contact opening C3. Moreover, part of the first drain 326a extends into a portion between the second pixel electrode 330b and the substrate 310 such that a capacitor-coupling electrode 330c is formed. In particular, the second pixel electrode 330b can be electrically connected to the second drain 326b of the sub-TFT 320b through a contact opening C4. In general, the first pixel electrode 330a and the second pixel electrode 330b can have a plurality of slits S so that liquid crystals (not shown) can be divided into a plurality of domains.

Furthermore, the pixel structure 300 of the present invention may also include a common line pattern 342 disposed on the substrate 310. At least a portion of the common line pattern 342 of the present invention extends along the edge of the first pixel electrode 330a and the second pixel electrode 330b. Obviously, the common line pattern 342 shown in FIG. 3A can have other shapes and can be selected on demand. Here, the shape of the common line pattern 342 is used only as an example and is not intended to limit the present invention. In practice, the common line pattern 342 only has to be electrically connected to a common voltage.

More specifically, after turning on the main thin film transistor 320a and the sub-TFT 320b, a display signal can be transmitted to the first pixel electrode 330a through the main thin film transistor 320a. Here, it should be mentioned that a first storage capacitor Cst1 (as shown in FIG. 3B) could be formed by the first pixel electrode 330a and the common line pattern 342 underneath. A first liquid crystal capacitor Clc1 is formed by the first pixel electrode 330a and a common electrode of an upper color filter (not shown).

Additionally, a coupling capacitor Cc is formed by the second pixel electrode 330b and the capacitor-coupling electrode 330c. The capacitor-coupling electrode 330c underneath the second pixel electrode 330b is coupled to the second pixel electrode 330b. A second storage capacitor Cst2 is formed by the second pixel electrode 330b and he common line pattern 342. On the other hand, a second liquid crystal capacitor Clc2 is formed by the second pixel electrode 330b and the common electrode above the upper color filter (not shown). In other words, the first pixel electrode 330a and the second pixel electrode 330b can have different voltages. As a result, the liquid crystals (not shown) corresponding to the first pixel electrode 330a and the second pixel electrode 330b can have different inclining states so as to provide a wide viewing angle in the display.

It should be note that the performance of the second pixel electrode 330b would not be affected because the conducting current of the sub-TFT 320b is very small. Here, it should be mentioned that the residual charges on the second pixel electrode 330b of a previous display picture could be removed through the sub-TFT 320b. As a result, the problem of having residual charges on the second pixel electrode 119b (as shown in FIG. 1) in the conventional design can be resolved. Therefore, the pixel structure 300 of the present invention can effectively suppress residual image and improve display quality. Moreover, it should be said the magnitude of the conducting current of the sub-TFT 320b can be suitably adjusted according to the actual requirements as long as it does not affect the normal performance of the second pixel electrode 330b.

In summary, a sub-thin film transistor having a very small conducting current is electrically connected to a second pixel electrode corresponding to the capacitor-coupling electrode. Therefore, the second pixel electrode may utilize the sub-thin film transistor of the present invention to remove unwanted residual charges so as to prevent the performance of the second pixel electrode from being adversely affect and effectively suppress the problem of having residual image in a display picture. Ultimately, the display quality is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel structure for being disposed on a substrate, the pixel structure comprising:
   a thin film transistor, disposed on the substrate and comprising a gate, a source, a first drain, a second drain and a third drain, wherein a first thin film transistor is formed by the gate, the source and the first drain, a second thin film transistor is formed by the gate, the source and the second drain, a sub-thin film transistor is formed by the gate, the second drain and the third drain, and when the sub-thin film transistor and the second thin film transistor are turned on, a conducting current of the sub-thin film transistor is smaller than a conducting current of the second thin film transistor, and the conducting currents form a specific ratio;
   a first pixel electrode, electrically connected to the first drain of the first thin film transistor;
   a second pixel electrode, the second drain extends to a portion between the second pixel electrode and the substrate to form a capacitor-coupling electrode, wherein the third drain of the sub-thin film transistor is electrically connected to the second pixel electrode;
   a scan line, disposed on the substrate and electrically connected to the gate; and
   a data line, electrically connected to the source.

2. The pixel structure according to claim 1, wherein the specific ratio is between 0.05~0.3.

3. The pixel structure according to claim 1, wherein the first pixel electrode has a plurality of slits.

4. The pixel structure according to claim 1, wherein the second pixel electrode has a plurality of slits.

5. The pixel structure according to claim 1, further comprising a common line pattern disposed on the substrate and electrically connected to a common voltage.

6. The pixel structure according to claim 5, wherein at least part of the common line pattern extends along an edge of the first pixel electrode and the second pixel electrode.

* * * * *